United States Patent [19]
Kurashita

[11] Patent Number: 5,515,527
[45] Date of Patent: May 7, 1996

[54] METHOD AND SYSTEM FOR MEASURING BRANCH PASSING COVERAGE IN MICROPROGRAM BY USE OF MEMORIES FOR HOLDING PROGRAM ADDRESSES OF INSTRUCTIONS CURRENTLY AND LATEST EXECUTED FOR USE IN LOGIC SIMULATOR

[75] Inventor: Masahiro Kurashita, Tokyo, Japan

[73] Assignee: NEC Corporation, Tokyo, Japan

[21] Appl. No.: 361,703

[22] Filed: Dec. 22, 1994

Related U.S. Application Data

[63] Continuation of Ser. No. 820,119, Jan. 13, 1992, abandoned.

[30] Foreign Application Priority Data

Jan. 11, 1991 [JP] Japan .................................. 3-012612

[51] Int. Cl.$^6$ ..................................................... G06F 9/455
[52] U.S. Cl. ...................... 395/500; 395/800; 364/261.3; 364/264.3; 364/DIG. 1
[58] Field of Search ..................................... 395/800, 500, 395/375; 364/261.3, 264.3, DIG. 1

[56] References Cited

U.S. PATENT DOCUMENTS

| | | | |
|---|---|---|---|
| 4,860,197 | 8/1989 | Langendorf et al. | 395/375 |
| 4,924,429 | 5/1990 | Kurashita et al. | 364/578 |
| 5,228,131 | 7/1993 | Ueda et al. | 395/375 |
| 5,283,873 | 2/1994 | Steely, Jr. et al. | 395/375 |

*Primary Examiner*—Alyssa H. Bowler
*Assistant Examiner*—John Harrity
*Attorney, Agent, or Firm*—Foley & Lardner

[57] ABSTRACT

In order to measure coverage of branching passes in a microprogram executed in a logic simulator, a first and a second memories are connected to a simulation executor. The first and the second memories hold, as a current and a latest step numbers, numbers of two instruction steps in the microprogram which are currently and latest executed by the simulation executor, respectively. When a pair of the current and the latest step number is coincident with one of the branching passes held in a branch table for holding information representative of each of the branching instruction steps and a coverage table for writing a passing time number for each of the branching passes, the passing time number is renewed. The coverage is computed from the passing time numbers written in the coverage table after the simulation is completed.

7 Claims, 6 Drawing Sheets

31, SOURCE TABLE

| ENTRY NO. | BRANCH FLAG | D.T.P. |
|---|---|---|
| 1 | 0 | - |
| 2 | 1 | 1 |
| 3 | 0 | - |
| 4 | 0 | - |
| 5 | 1 | 3 |
| 6 | 0 | - |
| 7 | 0 | - |

33, 34

32, DESTINATION TABLE

| ENTRY NO. | END FLAG | DESTINATION ADDRESS |
|---|---|---|
| 1 | 0 | 3 |
| 2 | 1 | 4 |
| 3 | 0 | 6 |
| 4 | 1 | 7 |
| 5 | | |

16, COVERAGE TABLE

| ENTRY NO. | PASSING TIME NUMBER |
|---|---|
| 1 | 0 |
| 2 | 1 |
| 3 | 0 |
| 4 | 0 |

15', BRANCH TABLE

| ENTRY NO. | BRANCH TABLE |
|---|---|
| 1 | 0 |
| 2 | 1 |
| 3 | 0 |
| 4 | 0 |
| 5 | 1 |
| 6 | 0 |
| 7 | 0 |

FIG. 8

16', COVERAGE TABLE

| ENTRY NO. | SOURCE ADDRESS | DESTINATION ADDRESS | PASSING TIME NUMBER |
|---|---|---|---|
| 1 | 2 | 3 | 0 |
| 2 | 2 | 4 | 1 |
| 3 | 5 | 6 | 0 |
| 4 | 5 | 7 | 0 |
| 5 |  |  |  |

51 52 53

FIG. 9

METHOD AND SYSTEM FOR MEASURING BRANCH PASSING COVERAGE IN MICROPROGRAM BY USE OF MEMORIES FOR HOLDING PROGRAM ADDRESSES OF INSTRUCTIONS CURRENTLY AND LATEST EXECUTED FOR USE IN LOGIC SIMULATOR This application is a continuation of application Ser. No. 07/820,119, filed Jan. 13, 1992, now abandoned.

BACKGROUND OF THE INVENTION

The present invention relates to a logic simulation, and in particular, to a method and a system for measuring coverage in a microprogram tested in the logic simulation.

In a conventional logic simulation, a logic simulation model and a microprogram are loaded in the logic simulator. The logic simulation model comprises types of gates included in a logic circuit to be simulated, connection between the gates, and program memory. The microprogram is loaded in the program memory. The microprogram comprises a series of instruction steps. In operation, a simulation executor executes instruction steps of the microprogram one after another using test data corresponding to various test cases and delivers an executed result to an external circuit or circuits, so that the logic simulation is performed.

The microprogram often includes one or more branch instructions in the series of instruction steps. The branch instruction is an instruction for destining different instruction steps as destination steps and for indicating to select one of the destination steps as an instruction step to be next executed. Accordingly, a pass of execution of instruction steps is branched or separated into different passes towards those destination steps at the branching instruction step. Those different passes towards the destination steps are referred to as branching passes. Selection of those branching passes is made in dependence on a condition at the branching instruction step.

Since instructions of the instruction steps in the microprogram are held in memory addresses in the program memory, the indication of those destination steps is made by use of memory addresses. Those memory addresses indicating the destination steps are referred to as destination addresses. On the other hand, the branching step is referred to as a source step and the memory address corresponding to the source step is also referred to as a source address.

In execution of the microprogram including the branching passes in the logic simulation, all of the branching passes are desired to be tested or passed. Accordingly, coverage of the branching passes passed in the simulation should be measured.

In a conventional simulator, the measuring is performed by use of information of change of signals resulted from the simulation by monitoring status of signals. However, the conventional measuring has a problem that the signal change information is too large and requires a large file capacity therefor.

SUMMARY OF THE INVENTION

Therefore, it is an object of the present invention to provide a method and a system for measuring coverage of branching passes in the microprogram passed in the logic simulation with a reduced file capacity and a reduced measuring time.

According to the present invention, a method is obtained for measuring coverage of branching passes in a microprogram passed in logic simulation. The microprogram comprises a series of instruction steps executed one after another by a simulation executor, the series of instruction steps including one or more branching instruction steps, the branching instruction step being an instruction for destining different instruction steps as destination steps and for indicating to select one of the destination steps as an instruction step to be next executed, a pass (path) of execution of instruction steps being branched into different passes (paths) as the branching passes towards the destination steps at each of the instruction steps. The method comprises steps of: (a) preparing a branch table indicating the branching instruction steps in the instruction steps and a coverage table for holding passing time (path execution) numbers for the branching passes; (b) referring to the branch table to detect whether or not the latest one of the instruction steps latest executed by the simulation executor is one of the branching instruction steps; (c) detecting a current one of the instruction steps currently executed by the simulation executor when the latest instruction step is one of the branch instruction steps; (d) renewing (updating) the passing time number for one of the branching passes which is a pass from the latest instruction step to the current instruction step; (e) repeating the above steps (b) to (d); and (f) accumulating the coverage from content in the coverage table after the simulation executor completes execution of the microprogram.

According to the present invention a system is obtained for measuring coverage of branching passes in a microprogram executed by a simulation executor. The microprogram comprises a series of instruction steps executed one after another by the simulation executor, the simulation executor producing a step completion signal and a simulation completion signal when execution of one step instruction is completed and when execution of the microprogram is completed, respectively, the series of instruction steps including one or more branching instruction steps, each of the branching instruction steps having an instruction for destining different instruction steps as destination steps and for indicating to select one of the destination steps as an instruction step to be next executed, a pass of execution of instruction steps being branched into different passes as the branching passes towards the destination steps at each of the instruction steps. The system comprises: a branch table for holding information of the branching instruction steps; a coverage table for writing passing time numbers for the branching passes, an initial value of each passing time numbers being set zero; first memory means coupled to the simulation executor for holding, as a current step number, one of the instruction steps currently executed by the simulation executor; second memory means for holding, as a latest step number, one of the instruction steps latest executed by the simulation executor; coverage table renewing means coupled to the simulation executor, the first and the second memory means, and the branch and the coverage tables responsive to the step completion signal from the simulation executor for detecting that a particular one of the branching passes is coincident with a pass corresponding to a pair of the latest step number and the current step number by referring to the first and the second memory means and the branch and the coverage tables to renew the passing time numbers for the particular branching pass in the coverage table, the coverage table renewing means then producing a renewal end signal; transferring means coupled to the first and the second memory means and the coverage table renewing means responsive to the renewal end signal for transferring the current step number from the first memory means into the second memory means as the latest step number to produce a transfer completion signal; simulation end deciding means coupled to the simulation executor and the transferring means responsive to the transfer completion signal for deciding the end of simulation to produce a start signal when receiving the simulation completion signal from the simulation executor; and means coupled with the simulation end deciding means and the coverage table responsive to the start signal for accumulating the coverage from contents in the coverage table.

DESCRIPTION OF PREFERRED EMBODIMENTS

Figure 1:
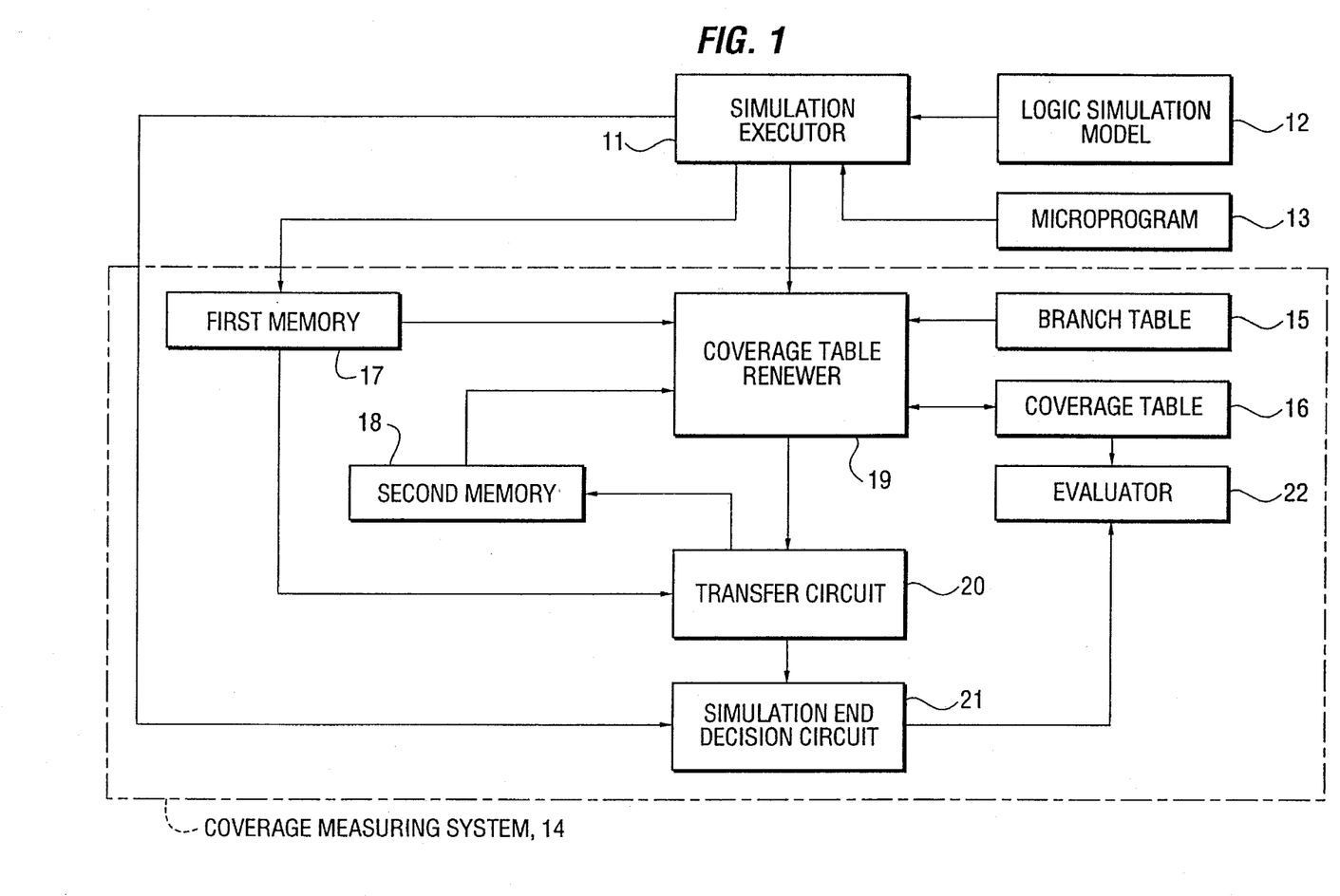
FIG. 1 is a block diagram view of a logic simulator including a coverage measuring system according to a first embodiment of the present invention.

Referring to FIG. 1, the logic simulator shown therein comprises a one step simulation executor 11, in which a logic simulation model 12 is loaded prior to start of the simulation. The logic simulation model 12 comprises types of gates included in a logic circuit to be simulated, connections between the gates, and a program memory. A microprogram 13 is also loaded in the memory in the simulation executor 11.

Figure 2:
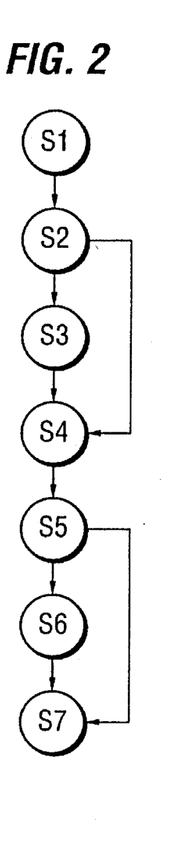
FIG. 2 is a flow chart of a microprogram executed in the simulator in FIG. 1.

Turning to FIG. 2, an example of the microprogram shown therein comprises a series of seven instruction steps S1 through S7. Instruction steps S2 and S5 are shown as branching instruction steps. That is, after execution of the branching instruction step S2, instruction steps S3 and S4 are selectively executed through two branching passes in dependence of a given condition at the branching instruction step S2. Similarly, after execution of the branching instruction step S5, instruction steps S6 and S7 are selectively executed through two branching passes in dependence of a given condition at the branching instruction step S5. In this example, the branch instruction steps S2 and S5 are source steps, and a pair of instruction steps S3 and S4 and another pair of instruction steps S6 and S7 are pairs of destination steps for the source steps S2 and S5, respectively.

The microprogram is loaded in the program memory in the logic simulation model similarly as in the prior art. That is, instructions of the instruction steps are memorized in memory addresses in the program memory, respectively. Accordingly, the instruction steps are corresponding to the memory addresses on a one to one basis.

Returning to FIG. 1, the one step simulation executor 11 executes instruction steps of the microprogram one after another using test data corresponding to various test cases and delivers an executed result to an external circuit or circuits (not shown), similarly as in the conventional logic simulator. Thus, the logic simulation is performed. In the simulator shown in FIG. 1, the simulation executor 11 produces a step completion signal at every completion of execution of one step instruction of the microprogram. When the simulation is completed, the simulation executor 11 produces a simulation completion signal.

The logic simulator further comprises a coverage measuring system 14 for measuring coverage of branching passes tested or passed in the logic simulation.

The coverage measuring system 14 comprises a branch table 15 for holding information of branching instruction steps in the microprogram and a coverage table 16 for writing passing time numbers for the branching passes. The branch table 15 and the coverage table 16 are previously prepared corresponding to the microprogram. The passing time numbers in the coverage table 16 are set to zero (0).

The coverage measuring system 14 further comprises a first memory 17 coupled to the simulation executor 11 for holding a current memory address of a current instruction step number corresponding to an instruction currently executed by the simulation executor 11, a second memory 18 for holding a latest memory address of a latest step number corresponding to an instruction latest executed by the simulation executor 11, and a coverage table renewer 19 coupled to the simulation executor 11, the first and the second memories 17 and 18 for renewing the coverage table 16.

The coverage table renewer 19 is responsive to the step completion signal from the simulation executor 11 and reads the current and the latest memory addresses from the first and the second memories 17 and 18 as a pair of read addresses. Looking at the branch table 15 and the coverage table 16, the coverage table renewer 19 renews the coverage table 16 when the coverage table renewer 19 searches, as a coincident address pair, a pair of the source and the destination addresses corresponding to the pair of read addresses. That is, the coverage table renewer 19 renews the passing time number for one of the branching passes corresponding to the coincident address pair. Then, the coverage table renewer 19 produces a renewal end signal. When the latest address is not coincident with any one of source addresses in the branch table 15, the coverage table 19 also produces the renewal end signal without renewing the coverage table 16.

The coverage measuring system 14 further comprises a transfer circuit 20 coupled to the first and second memories 17 and 18 and the coverage table renewer 19. The transfer circuit 20 is responsive to the renewal end signal from the coverage table renewer 19 and transfers the current memory address in the first memory 17 into the second memory 18 as the latest memory address. After completing the transfer of the current memory address, the transfer circuit 20 produces a transfer completion signal. A simulation end decision circuit 21 is coupled to the simulation executor 11 and the transfer circuit 20. Responsive to the transfer completion signal, the simulation end decision circuit 21 decides whether or not the simulation is completed. When receiving the simulation completion signal from the simulation executor 11, the simulation end decision circuit 21 decides the end of simulation and produces a start signal. An evaluator 22 is coupled to the simulation end decision circuit 21 and the coverage table 16. Upon reception of the start signal from the simulation end decision circuit 21, the evaluator 22 reads out the contents in the coverage table 16 and accumulates coverage of the branch passes passed in the simulation.

Figure 3:
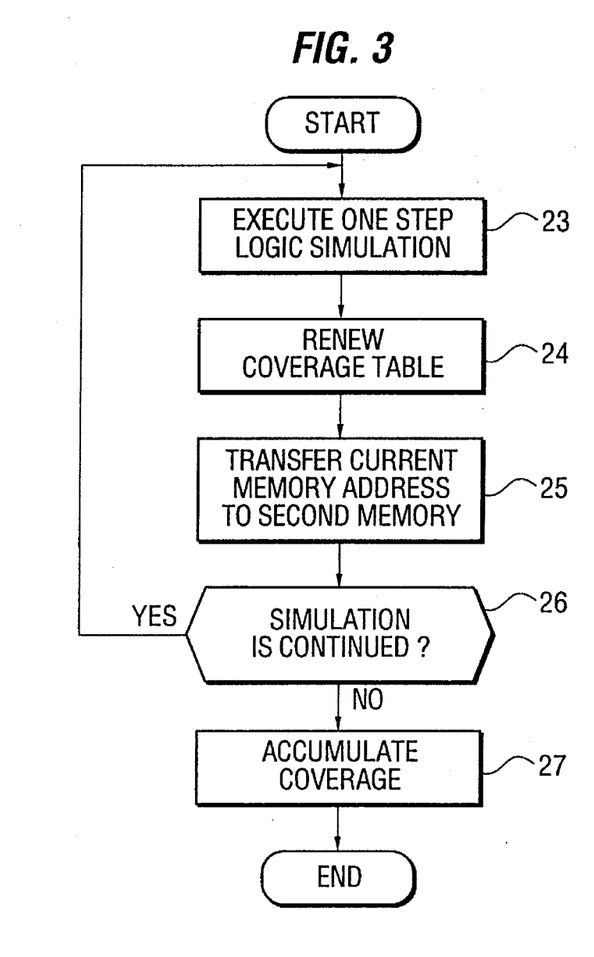
FIG. 3 is a flow chart illustrating operation of the simulator in FIG. 1.

Referring to FIG. 3, description is made as to operation of the logic simulator of FIG. 1. After start of the simulation, the simulation executor 11 executes instruction steps one after another as shown at a step 23. The first memory 17 memorizes the current memory address or the current instruction step number which is currently executed by the simulation executor 11. When completion of execution of one instruction step, the simulation executor 11 produces the step completion signal. The coverage table renewer 19 is responsive to the step completion signal and looks at the first and the second memories 17 and 18 and the branch and the coverage tables 15 and 16. Then the coverage table renewer 19 renews the coverage table 16 as shown at a step 24, when the renewal is necessary as described above. The coverage table renewer 19 produces a renewal end signal when the renewal is completed or when the renewal is not necessary. The transfer circuit 20 receives the renewal end signal and transfers the current memory address in the first memory 17 into the second memory 18 as the latest memory address, as shown at step 25. Then, the transfer circuit 20 produces the transfer completion signal. The simulation end decision circuit 21 decides whether or not the simulation is completed, as shown at step 26. When the simulation end decision circuit 21 does not receive the simulation completion signal from the simulation executor 11, those steps 23 through 26 are repeated.

During repetition of the steps 23 through 26, the current memory address and the latest memory address are renewed.

When receiving the simulation completion signal from the simulation executor 11, the simulation decision circuit 21 produces the start signal. The evaluator 22 receives the start signal and reads out the contents in the coverage table 16 to accumulate the coverage.

Figure 4:
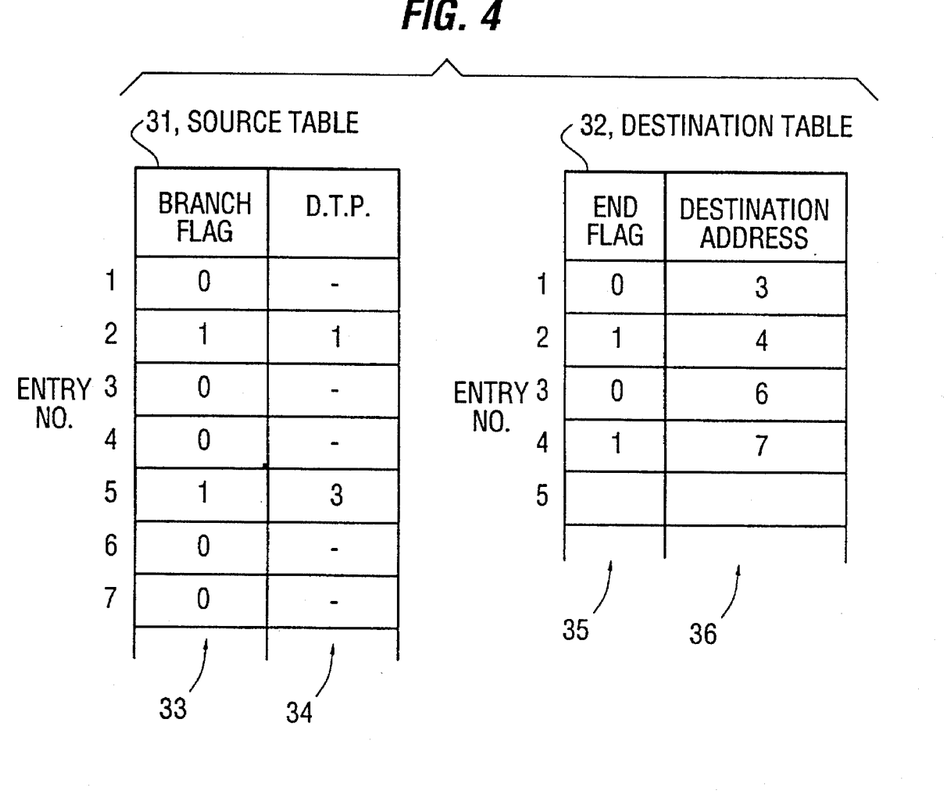
FIG. 4 illustrates an example of a branch table in FIG. 1.

Referring to FIG. 4, the branch table 15 comprises a source table 31 and a destination table 32. The source table 31 comprises a plurality of entry sections which are corresponding to memory addresses of instruction steps, for example, S1 through S7 in FIG. 2, of the microprogram. Each entry section is separated into two columns, that is, a branch flag (B.F.) column 33 and a destination table pointer (D.T.P.) column 34. When a particular one of the instruction steps of the microprogram is the branching instruction step, the branch flag is "1". That is, "1" is held in the branch flag column 33 in a particular one of the entry sections corresponding to the particular instruction step. In the example of the microprogram shown in FIG. 2, the branching instruction steps are S2 and S5. Accordingly, "1" is held in the branch flag column 33 in Nos. 2 and 5 entry sections corresponding to the steps S2 and S5. "0" is held in the branch flag column 33 in the other entry sections of Nos. 1, 3, 4, 6 and 7.

The destination table pointer is for indicating a particular one of entry sections of the destination table 32. That is, an entry section number in the destination table 32 is written in the destination table pointer column 34 in the entry section in the source table 31 corresponding to each of branching instruction steps. In the example shown, "1" and "3" are written in the destination table pointer column 34 in Nos. 2 and 5 entry sections of the source table 31.

The destination table 32 also has a plurality of entry sections. Each of the entry sections is separated into two columns, that is, an end flag column 35 and a destination address column 36.

For a single source address, there are a plurality of destination addresses. With respect to the entry sections in the destination table 32, an entry set of entry sections adjacent to each other is used for writing destination addresses for the single source address. A number of entry sections in one entry set is equal to the number of the destination addresses for the single source address. In the example in FIG. 2, there are two destination steps S3 and S4 for the first branching step S2. Therefore, an entry set of two entry sections of Nos. 1 and 2 are used for writing the destination address or steps. That is, "3" and "4" are written in the destination column 36 in Nos. 1 and 2 entry sections. In the last entry section, that is, No. 2 entry section, in the entry set, "1" is written in the end flag column 35. The remaining entry section or sections in the entry set is written with "0". An entry number of the first entry section in the entry set is used as the destination table pointer in the source table 31.

In the similar manner, another entry set of Nos. 3 and 4 entry sections is used for writing the destination addresses for the second branching instruction step S5. In the entry sections of Nos. 3 and 4, "0" and "1" are written in the end flag column 35, respectively, and "6" and "7" are written in the destination address column 36.

Figure 5:
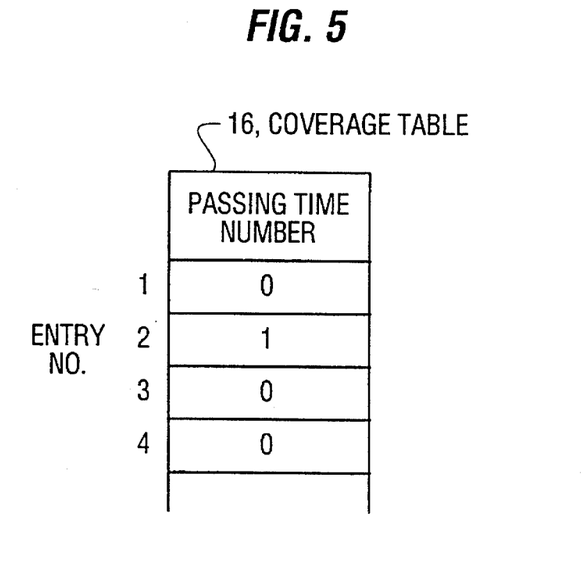
FIG. 5 illustrates an example of a coverage table in FIG. 1.

Referring to FIG. 5, the coverage table 16 comprises a plurality of entry sections which are corresponding to entry sections in the destination table 32. Therefore, the entry sections in the coverage table 16 are corresponding to the branching passes. The passing time numbers for the branching passes are written into the entry sections in the coverage table 16. At a start of the simulation, "0" is written, as the initial value, into all of the entry sections in the coverage table 16. In the shown example, "1" is written in the entry section of No. 2 corresponding to the first branching pass from the source address "2" or the first branching instruction step S2 to the destination address "4" or the destination step S4. This means that the branching pass is passed in the simulation.

Now, description will be made in detail as regards step 24 in FIG. 3 or operation of the coverage table renewer 19 for renewing the coverage table 16 in FIG. 5 by use of the source and the destination tables 31 and 32 in FIG. 4.

Figure 6:
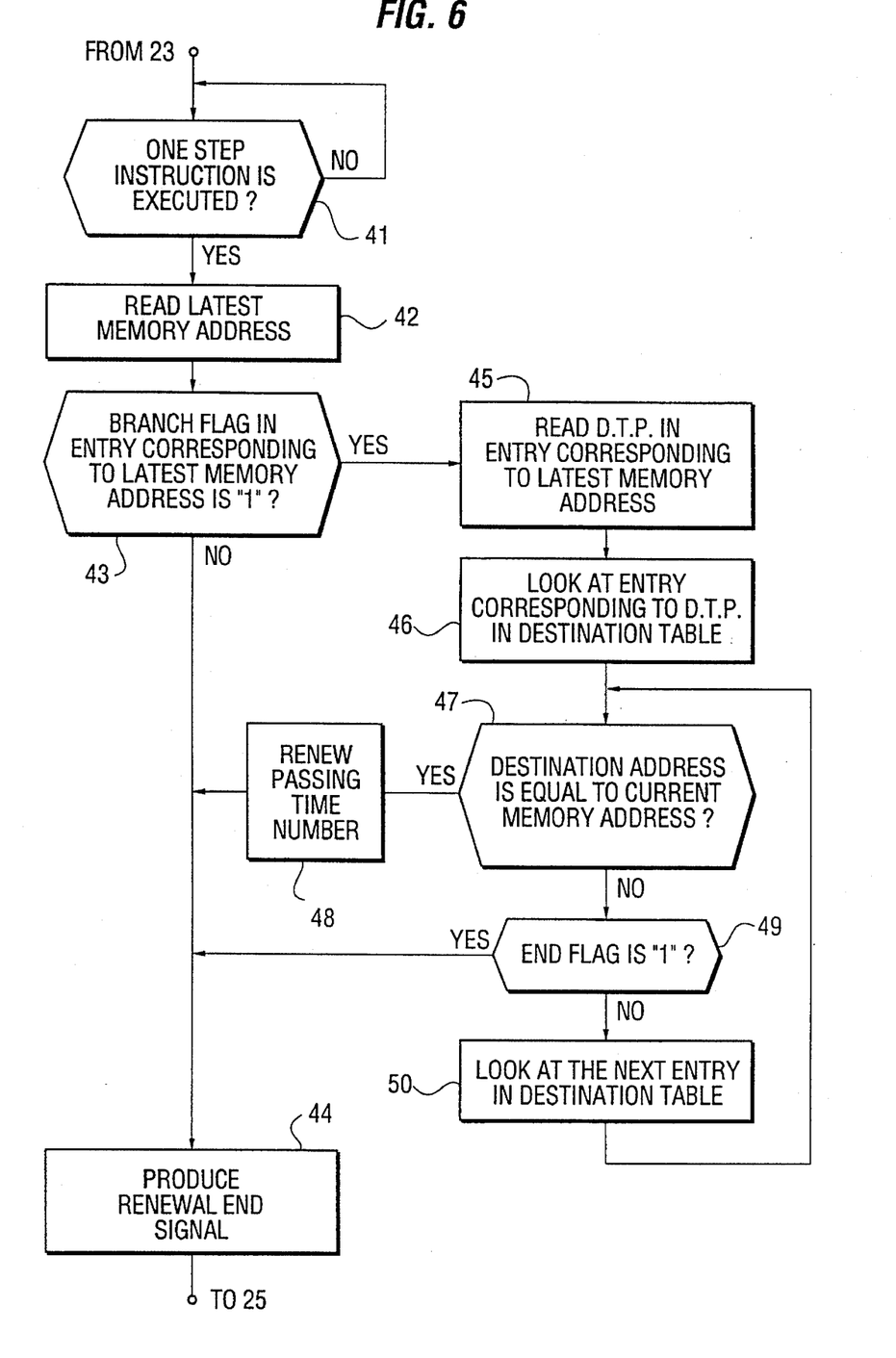
FIG. 6 is a flow chart illustrating operation of a coverage table renewer in FIG. 1.

Referring to FIG. 6, the coverage table renewer 19 waits until the simulation executor 11 completes execution of the one step instruction, as shown at step 41. When the simulation executor 11 completes the one step instruction execution and when the coverage table renewer 19 receives the step completion signal, the coverage table renewer 19 reads the latest memory address in the second memory 18, as shown at step 42. Then, the coverage table renewer 19 looks at the source table 31 and detects whether or not the branch flag is "1" in the entry section corresponding to the latest memory address, as shown at step 43. When the branch flag is not "1", the coverage table renewer 19 produces the renewal end signal, as shown at step 44. When the branch flag is "1", the coverage table renewer 19 reads, as a read out pointer, the destination table pointer in the entry section corresponding to the latest memory address, as shown at step 45. Then, the coverage table renewer 19 looks at the entry section in the destination table 32 corresponding to the read pointer, as shown at step 46. Then, the coverage table renewer 19 compares the current memory address in the first memory 17 with the destination address in the entry section corresponding to the read pointer, as shown at step 47. When the both are equal to or coincident with each other, the coverage table renewer 19 renews the passing time number in the corresponding entry section in the coverage table 16, as shown at step 48. Then, the renewal end signal is produced at step 44.

At step 47, when coincidence is not detected, the coverage table renewer 19 looks at the end flag in the entry section in the destination table 32 and detects whether or not the end flag is "1", as shown at step 49. When the end flag is "1", the renewal end signal is produced at step 44. When the end signal is not "1", the coverage table renewer 19 looks a next one of the entry section in the destination table 32, as shown at step 50. Then, the coverage table renewer 19 returns the step to step 47 and repeatedly carries out those steps 47 through 50. The coverage table renewer 19 eventually produces the renewal end signal at step 44.

Referring to the example shown in FIGS. 4 and 5, when the latest memory address is "2" at step 42, the branch flag is "1" at step 43. The read pointer is "1" at step 45. Therefore, the entry section of No. 1 in destination table 32 is looked at step 46. When the current memory address in the first memory 17 is "4", the destination address "3" in the entry section of No. 1 in the destination table 32 is not coincident with the current memory address "4" at step 47. Accordingly, the end flag in the entry section of No. 1 in the destination table 32 is searched and is detected as "0" at step 49. Therefore, the coverage table renewer 19 looks at NO. 2 entry section in the destination table 32 at step 50. The destination address "4" in the No. 2 entry section in the destination table 32 is coincident with the current memory address at step 47. Accordingly, the coverage table renewer 19 renews the passing time number in the corresponding entry section of No. 2 in the coverage table 16 from "0" to "1" at step 48. The result is shown in FIG. 5.

Now, description will be made as regards a second embodiment of the present invention. Since the second embodiment is similar to the first embodiment of FIG. 1 but is merely different therefrom in the branch table 15, the coverage table 16 and operation of the coverage table renewer 19, the difference will only be described with reference to FIGS. 7 to 9.

Figure 7:
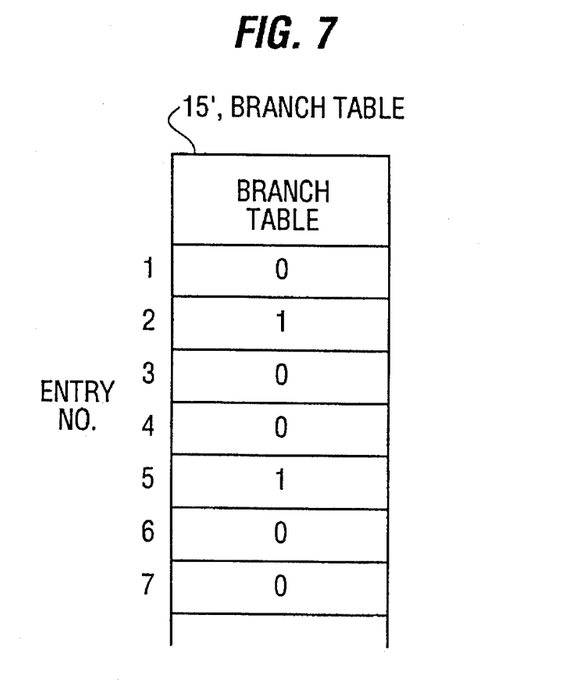
FIG. 7 illustrating an example of a branch table according to a second embodiment of the present invention.

Referring to FIG. 7, the branch table 15' in the second embodiment comprises a plurality of entry sections corresponding to the memory addresses of the instruction steps of the microprogram. The branch flags are written in the entry sections. The branch table 15' is similar to the source table 31 in FIG. 4 but is different therefrom in absence of the destination table pointer column 34. The branch table 15' does not have the destination table 32.

Figure 8:
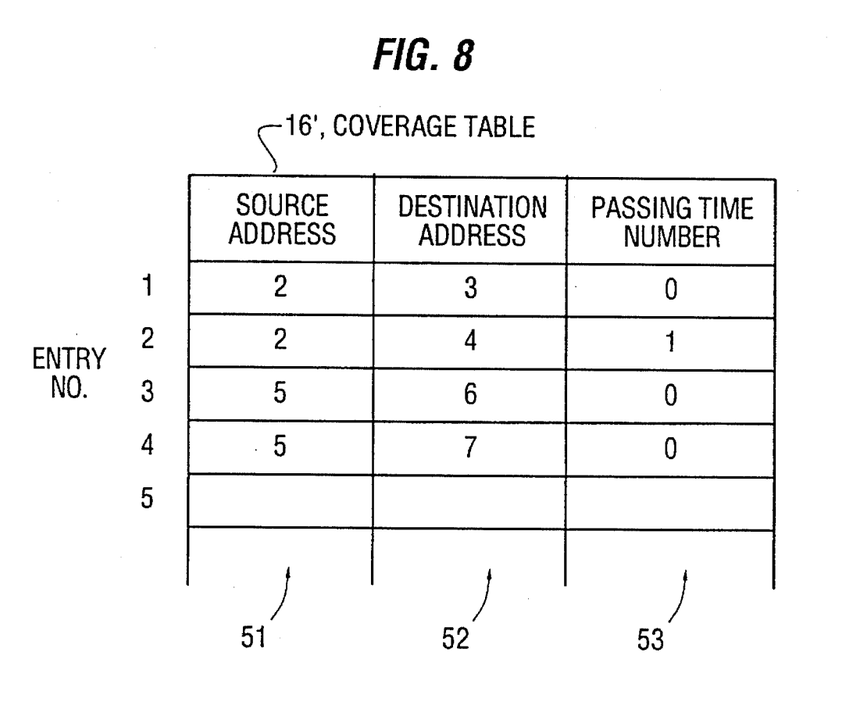
FIG. 8 illustrating an example of a branch table according to the second embodiment.

Referring to FIG. 8, the coverage table 16' of the second embodiment comprises a plurality of entry sections. Each entry section is separated into three columns 51 through 53 for holding the source address, the destination address, and the passing time number for a branching pass from the source address to the destination address. Therefore, the entry sections in the coverage table 16' are corresponding to the branching passes.

In FIGS. 7 and 8, the branch table 15' and the coverage table 16' are shown according to the example of the microprogram shown in FIG. 2.

Figure 9:
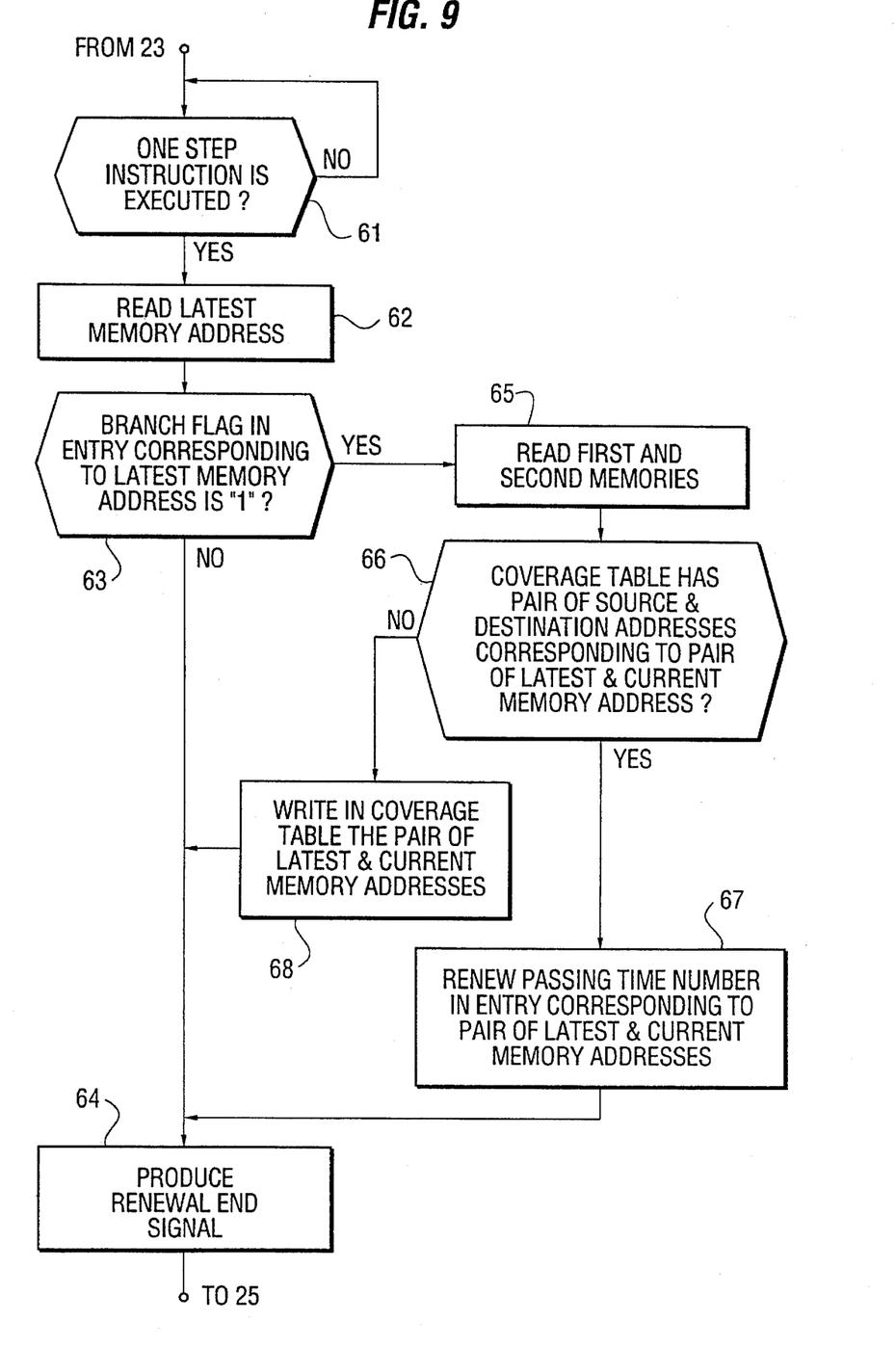
FIG. 9 is a flow chart illustrating operation of a coverage table renewer according to the second embodiment.

Referring to FIGS. 9 and 1, description will be made as regards operation of the coverage table renewer 19 in the second embodiment, below.

The coverage table renewer 19 waits until the simulation executor 11 produces the step completion signal at step 61. When receiving the step completion signal, the coverage table renewer 19 reads the latest memory address in the second memory 18 at step 62. Then, the coverage table renewer 19 looks at the branch table 15' and detects whether or not the branch flag is "1" in the entry section corresponding to the latest memory address as shown at step 63. The branch flag is not "1", the coverage table renewer 19 produces the renewal end signal, as shown at step 64. When the branch flag is "1", the coverage table renewer 19 reads the current and the latest memory addresses in the first and the second memories 17 and 18, as shown at step 65, and searches the coverage table 16' to detect a pair of the destination address and the source address corresponding to the pair of the current address and the latest address, as shown at step 66. When a pair of the destination address and the source address is detected, as a coincident pair, coincident with the pair of the current address and the latest address, the coverage table renewer 19 renews the passing time number in the entry section of the coincident pair in the coverage table 16' from "0" to "1", as shown at step 67. Then, the renewal end signal is produced at step 64. When the coincident pair is not detected, the coverage table renewer 19 writes the latest and the current memory addresses into the columns 51 and 52 in a vacant entry section in the coverage table 16' and also writes "1" in the passing time number column in the vacant entry section, as shown at step 68. Then, the coverage table renewer 19 produces the renewal completion signal at step 64.

Referring to the example shown in FIGS. 7 and 8, when the latest memory address is "2" at step 62, the branch flag is "1" at step 63. When the current memory address is "4", the pair of current and the latest memory addresses are "4" and "2" at step 65. Since a pair of the destination and the source addresses corresponding to the pair of "4" and "2" is detected in entry section of No. 2 in the coverage table 16' at step 66, the coverage table renewer 19 renews the passing time number in the entry section of No. 2 in the coverage table 16' from "0" to "1" at step 67. The result is shown in FIG. 8.

What is claimed is:

1. An apparatus for measuring coverage of branching paths in a microprogram being executed in logic simulation, said microprogram comprising a series of instruction steps, comprising:

a simulation executor for executing said series of instruction steps one after another, said simulation executor producing a step completion signal and a simulation completion signal when execution of one step instruction is complete and when execution of the microprogram is completed, respectively, the series of instruction steps including one or more branching instruction steps, each of the branching instruction steps having an instruction for designating different instruction steps having destination steps and for indicating to select one of the destination steps as an instruction step to be next executed, a path of execution of instruction steps being branched into different paths at each of the branching instruction steps;

a branch table for holding information of said branching instruction steps, said branch table being prepared to indicate the branching instruction steps in the microprogram before start of the simulation;

a coverage table containing a path execution number for each of said branching paths, said path execution number being used to represent how many times each of said branching paths is executed during the simulation, an initial value of each path execution number being set to zero;

first memory means coupled to said simulation executor for holding, as a current step number, one of the instruction steps currently executed by said simulation executor;

second memory means for holding, as a latest step number, one of the instruction steps latest executed by said simulation executor;

coverage table renewing means coupled to said simulation executor, said first and said second memory means, and said branch and said coverage tables responsive to said step completion signal from said simulation executor for detecting that a particular one of said branching paths is coincident with a path corresponding to a pair of said latest step number and said current step number by referring to said first and said second memory means and said branch and said coverage tables to renew said path execution number for the particular branching path in said coverage table, said coverage table renewing means then producing a renewal end signal;

transferring means coupled to said first and said second memory means and said coverage table renewing means responsive to said renewal end signal for transferring said current step number from said first memory means into said second memory means as said latest step number to produce a transfer completion signal;

simulation end deciding means coupled to said simulation executor and said transferring means responsive to said transfer completion signal for deciding an end of the simulation to produce a start signal when receiving said simulation completion signal from said simulation executor; and means coupled with said simulation end deciding means and said coverage table responsive to said start signal for accumulating said coverage from contents in said coverage table.

2. An apparatus as claimed in claim 1, wherein said branch table holds a branch flag for indicating each of said branching instruction steps in the instruction steps and information representative of pairs of each of the branching instruction steps and said destination steps destined by each of said branching instruction steps, said pairs being representative of said branching passes.

3. An apparatus as claimed in claim 1, wherein said branch table holds a branch flag for indicating each of said branching instruction steps in the instruction steps, and said coverage table holds pairs of each of the branching instruction steps and said destination steps designated by each of said branching instruction steps, said pairs being representative of said branching paths.

4. An apparatus as claimed in claim 3, wherein, upon detecting said branch flag in said branch table for said latest step number, said coverage table renewing means writes in a vacant section in said coverage table a pair of said latest and said current step numbers as an additional pair representative of one of said branching passes when said pair of the latest and the current step numbers is not detected in said coverage table.

5. A system as claimed in claim 1, wherein said branch table comprises:

a source table comprising a plurality of entry sections corresponding to memory addresses of instruction steps including said branching instruction steps, each of said entry sections including a branch flag and a destination table pointer, said branch flag having one of either a first state indicating that a corresponding instruction step is a branch instruction and a second state indicating that said corresponding instruction step is not a branch instruction; and a destination table comprising a plurality of entry sections corresponding to said branching instruction steps stored in said source table, each of said entry sections in said destination table including an end flag and a destination address corresponding to said end flag, said end flag having one of either a first state indicating a no branch condition and a second state indicating a branch condition.

6. A logic simulator comprising:

simulation executing means to be loaded with a logic simulation model and a microprogram, said logic simulation model comprising types of gates included in a logic circuit to be simulated, connection between the gates, and a program memory for loading said microprogram, said microprogram comprising a series of instruction steps executed one after another by said simulation executing means, said simulation executing means producing a step completion signal and a simulation completion signal when execution of one step instruction is completed and when execution of the microprogram is completed, respectively, the series of instruction steps including one or more branching instruction steps, each of the branching instruction steps having an instruction for designating different instruction steps as destination steps and for indicating one of the destination steps as an instruction step to be next executed, a path of execution of instruction steps being branched into different paths at each of the branching instruction steps;

a branch table for holding information of said branching instruction steps, said branch table being prepared to indicate the branching instruction steps in the microprogram;

a coverage table for writing a branch execution number for each of said branching paths, said branch execution number being used to represent how many times each of said branching paths is executed during the simulation, an initial value of each said path execution number being set to zero;

first memory means coupled to said simulation executing means for holding, as a current step number, one of the instruction steps currently executed by said simulation executing means;

second memory means for holding, as a latest step number, one of the instruction steps latest executed by said simulation executing means;

coverage table renewing means coupled to said simulation executing means, said first and said second memory means, and said branch and said coverage tables responsive to said step completion signal from said simulation executing means for detecting that a particular one of said branching paths is coincident with a path corresponding to a pair of said latest step number and said current step number by referring to said first and said second memory means and said branch and said coverage tables to renew said branch execution number for the particular branching path in said coverage table, said coverage table renewing means then producing a renewal end signal;

transferring means coupled to said first and said second memory means and said coverage table renewing means responsive to said renewal end signal for transferring said current step number from said first memory means into said second memory means as said latest step number to produce a transfer completion signal;

simulation end deciding means coupled to said simulation executing means and said transferring means responsive to said transfer completion signal for deciding an end of said simulation to produce a start signal when receiving said simulation completion signal from said simulation executing means; and means coupled with said simulation end deciding means and said coverage table responsive to said start signal for accumulating said coverage from contents in said coverage table.

7. A system as claimed in claim 6, wherein said branch table comprises:

a source table comprising a plurality of entry sections corresponding to memory addresses of instruction steps including said branching instruction steps, each of said entry sections including a branch flag and a destination table pointer, said branch flag having one of either a first state indicating that a corresponding instruction step is a branch instruction and a second state indicating that said corresponding instruction step is not a branch instruction; and a destination table comprising a plurality of entry sections corresponding to said branching instruction steps stored in said source table, each of said entry sections in said destination table including an end flag and a destination address corresponding to said end flag, said end flag having one of either a first state indicating a no branch condition and a second state indicating a branch condition.

* * * * *